(12) United States Patent
Liu et al.

(10) Patent No.: US 11,559,868 B2
(45) Date of Patent: Jan. 24, 2023

(54) WHEEL MACHINING EQUIPMENT

(71) Applicant: CITIC Dicastal CO., LTD., Hebei (CN)

(72) Inventors: Huiying Liu, Qinhuangdao (CN); Wen Xiong, Qinhuangdao (CN); Yudong Li, Qinhuangdao (CN)

(73) Assignee: CITIC DICASTAL CO., LTD., Hebei (CN)

( * ) Notice: Subject to any disclaimer, the term of this patent is extended or adjusted under 35 U.S.C. 154(b) by 87 days.

(21) Appl. No.: 16/700,265

(22) Filed: Dec. 2, 2019

(65) Prior Publication Data
US 2020/0307309 A1 Oct. 1, 2020

(30) Foreign Application Priority Data
Mar. 26, 2019 (CN) .......................... 201910232044.X

(51) Int. Cl.
B23Q 39/04 (2006.01)
B23B 29/24 (2006.01)

(52) U.S. Cl.
CPC .......... *B23Q 39/048* (2013.01); *B23B 29/242* (2013.01); *B23B 2215/08* (2013.01); *B23Q 2230/006* (2013.01); *B60B 2310/231* (2013.01); *Y10T 82/2508* (2015.01)

(58) Field of Classification Search
CPC ............ B23Q 39/048; B23Q 2220/002; B23Q 2230/006; B23B 29/24; B23B 29/242; Y10T 29/5153; Y10T 29/5154; Y10T 82/2506; Y10T 82/2508; Y10T 82/2585; Y10T 82/2587; B60B 2310/231

USPC ................. 82/120, 121, 158, 159; 29/36, 39
See application file for complete search history.

(56) References Cited

U.S. PATENT DOCUMENTS

| | | | | |
|---|---|---|---|---|
| 4,457,193 A * | 7/1984 | Matthey | ................. | B23B 3/06 29/36 |
| 5,117,544 A * | 6/1992 | Kousaku | ................. | B23B 3/06 29/27 C |
| 5,127,140 A * | 7/1992 | Oiwa | ................. | B23Q 39/026 29/27 C |
| 5,490,307 A * | 2/1996 | Link | ................. | B23B 3/168 29/27 C |
| 5,562,007 A * | 10/1996 | Seymour | ................. | B23B 31/185 279/2.24 |
| 5,820,137 A * | 10/1998 | Patterson | ................. | B23B 31/185 279/141 |
| 6,502,834 B1 * | 1/2003 | Fukui | ................. | B23B 31/201 279/2.04 |
| 10,155,267 B1 * | 12/2018 | Yang | ................. | B23B 31/18 |

(Continued)

FOREIGN PATENT DOCUMENTS

| | | | | |
|---|---|---|---|---|
| EP | 0999002 A1 * | 5/2000 | ............ | B23B 3/168 |
| EP | 1897640 A1 * | 3/2008 | ............ | B23B 29/323 |
| JP | 04122501 A * | 4/1992 | ............ | B23Q 39/048 |

*Primary Examiner* — Boyer D Ashley
*Assistant Examiner* — Michael Vitale
(74) *Attorney, Agent, or Firm* — Cooper Legal Group, LLC

(57) ABSTRACT

Wheel machining equipment is provided, including a first-stage turning system used for carrying out first-stage turning of a wheel, a high-precision connection system used for carrying out high-precision positioning conversion from first-stage turning to second-stage turning, and a second-stage turning system used for carrying out second-stage turning of the wheel. A wheel machining method is also provided.

2 Claims, 4 Drawing Sheets

(56) References Cited

U.S. PATENT DOCUMENTS

| | | | |
|---|---|---|---|
| 2003/0029286 A1* | 2/2003 | Kumano | B23B 3/167 82/121 |
| 2007/0044290 A1* | 3/2007 | Grossmann | B23Q 1/5462 29/36 |
| 2007/0068350 A1* | 3/2007 | Kawasumi | B23B 3/167 82/121 |
| 2014/0251097 A1* | 9/2014 | Walz | B23Q 39/026 82/121 |
| 2018/0111238 A1* | 4/2018 | Tsuchida | B23C 1/08 |

* cited by examiner

WHEEL MACHINING EQUIPMENT

CROSS-REFERENCE TO RELATED APPLICATIONS

The present application claims benefit of Chinese Patent Application No. 201910232044.X, filed on Mar. 26, 2019, the contents of which are hereby incorporated by reference in their entirety.

BACKGROUND

One of the key processes of aluminum alloy wheel manufacturing is machining. The dimensional accuracy of the outer diameter, wall thickness and assembly of wheels are all determined by the machining process. The main factors affecting the machining accuracy include tooling fixtures, tools, equipment and technology. At present, the wheel machining process is generally completed by two turning stages; a first-stage turning and a second-stage turning are carried out by two independent pieces of equipment respectively, or an interactive double-station machine tool is adopted for processing. The two processing ways both have a defect that the first-stage turning and the second-stage turning are not precisely connected, after the first-stage turning is completed, a manipulator or operators perform feeding and discharging for switching the wheel from the first-stage turning to the second-stage turning, and the matching precision of a central hole processed in the first-stage turning and a mandrel in the second stage is not high; in this way, the coaxiality of an inner side and an outer side of a processed wheel is generally deviated, what is more, wheel hop may be unqualified, resulting in rejected products. Based on the present situation, the disclosure provides a wheel machining equipment, which integrates the first-stage turning and the second-stage turning into one piece of equipment, so as to improve the matching precision of the central hole and the mandrel in the second stage, realize the high-precision connection of the first-stage turning and the second-stage turning, improve the coaxiality of the inner side and the outer side of the wheel, and greatly improve the product quality.

SUMMARY

The disclosure relates to the technical field of wheel machining, in particular to equipment for turning wheels.

The disclosure aims to provide wheel machining equipment, which can integrate first-stage turning and second-stage turning into one piece of equipment, so as to improve the matching precision of a central hole and a mandrel in the second stage, realize the high-precision connection of the first-stage turning and the second-stage turning, and improve the coaxiality of an inner side and an outer side of a wheel.

In order to achieve the above purpose, the technical solution of the disclosure is as follows: Wheel machining equipment includes a lathe bed, a plurality of first guide rails, a first servo motor, a first servo moving unit, a first spindle unit, a first-stage chuck, a plurality of radial positioning blocks, a plurality of first end-face positioning blocks, a plurality of first swing clamp cylinder pressure claws, a first servo feed system, a first tool turret, second guide rails, a second servo motor, a second servo moving unit, a second spindle unit, a second-stage chuck, a mandrel base, a mandrel, a plurality of second end-face positioning blocks, a plurality of second swing clamp cylinder pressure claws, a second servo feed system and a second tool turret.

The first servo motor, the first guide rails and the first servo moving unit are installed on a left side of the lathe bed. The first servo moving unit is driven by the first servo motor to horizontally move along the first guide rails, and the path of the first servo moving unit is defined as a Q1 axis. The first servo moving unit is provided with the first spindle unit, an output end of the first spindle unit is provided with the first-stage chuck, and the rotation of the first-stage chuck is controlled by the first spindle unit. The three radially adjustable radial positioning blocks are 120 degrees apart and are uniformly distributed on the first-stage chuck in the circumferential direction, and the radial positioning blocks are used for radially positioning a wheel during first-stage machining; the three first end-face positioning blocks are 120 degrees apart and are uniformly distributed on the first-stage chuck in the circumferential direction, and the first end-face positioning blocks are used for axially positioning the wheel during first-stage machining; and the three first swing clamp cylinder pressure claws are 120 degrees apart and are uniformly distributed on the first-stage chuck in the circumferential direction, and the first swing clamp cylinder pressure claws are used for clamping the wheel during first-stage machining. The first servo feed system is installed at the top of the lathe bed, the first servo feed system is composed of two axes which are defined as an X1 axis and a Z1 axis, and the first tool turret is controlled by the first servo feed system to feed, so as to realize linkage turning and interpolation movement of the X1 axis and the Z1 axis. This makes the first-stage turning system. The first spindle unit drives the wheel to rotate, and the first servo feed system controls the first tool turret to feed to realize the two-axis linkage cutting for completing the first-stage machining of the wheel.

The second servo motor, the second guide rails and the second servo moving unit are installed on a right side of the lathe bed. The second servo moving unit can be driven by the second servo motor to horizontally move along the second guide rails, and the path of the second servo moving unit is defined as a Q2 axis. The second servo moving unit is provided with the second spindle unit, an output end of the second spindle unit is provided with the second-stage chuck, and the rotation of the second-stage chuck is controlled by the second spindle unit. The mandrel base is arranged at a center of the second-stage chuck, the mandrel is arranged on the mandrel base, and the mandrel is used for radially positioning the wheel during second-stage machining; the three second end-face positioning blocks are 120 degrees apart and are uniformly distributed on the second-stage chuck in the circumferential direction, and the second end-face positioning blocks are used for axially positioning the wheel during second-stage machining; and the three second swing clamp cylinder pressure claws are 120 degrees apart and are uniformly distributed on the second-stage chuck in the circumferential direction, and the second swing clamp cylinder pressure claws are used for clamping the wheel during second-stage machining After the first-stage turning of the wheel is completed, the wheel does not need to be unloaded, and the first servo moving unit is driven by the first servo motor to do horizontal rightward movement along the Q1 axis until horizontally pushing the wheel to an appropriate position; at the same time, the second servo moving unit is driven by the second servo motor to do horizontal leftward movement along the Q2 axis to meet the wheel; and when the second end-face positioning blocks on the second-stage chuck make contact with a wheel rim on the inner side of the wheel, the second servo moving unit stops moving, then the second swing clamp cylinder pressure claws are activated and clamp the wheel on the second-stage chuck, and then the first swing clamp cylinder pressure claws release the wheel, and the first-stage chuck is withdrawn and restored to its original position. At this point, high-precision connection of the first-stage machining and the second-stage machining is completed.

As the wheel is not unloaded during connection, high-precision matching of a central hole processed in the first stage and the mandrel in the second stage can be ensured, the matching precision can reach 0.02-0.03 mm, which is greatly improved compared with the traditional 0.04-0.06 mm, and the coaxiality in the first stage and the second stage is greatly improved.

The second servo feed system is installed on the bottom of the lathe bed, the second servo feed system includes two axes which are defined as an X2 axis and a Z2 axis, and the second tool turret is controlled by the second servo feed system to feed, so as to realize linkage turning and interpolation movement of the X2 axis and the Z2 axis. This makes the second-stage turning system. The second spindle unit drives the wheel to rotate, and the second servo feed system controls the second tool turret to feed to realize the two-axis linkage cutting for completing the second-stage machining of the wheel.

The working process of the wheel machining equipment includes: firstly, feeding is carried out by a manipulator or operators, a wheel blank is clamped on the first-stage chuck, then the lathe bed is started, and the first tool turret is controlled by the first servo feed system to feed, so as to realize first-stage linkage turning of the X1 axis and the Z1 axis; after the first-stage turning of the wheel is completed, the wheel does not need to be unloaded, and the first servo moving unit is driven by the first servo motor to do horizontal rightward movement along the Q1 axis until horizontally pushing the wheel to the appropriate position; at the same time, the second servo moving unit is driven by the second servo motor to do horizontal leftward movement along the Q2 axis to meet the wheel; and when the second end-face positioning blocks on the second-stage chuck make contact with the wheel rim on the inner side of the wheel, the second servo moving unit stops moving, then the second swing clamp cylinder pressure claws are activated and clamp the wheel on the second-stage chuck, then the first swing clamp cylinder pressure claws release the wheel, and the first-stage chuck is withdrawn and restored to its original position. At this point, high-precision connection of the first-stage machining and the second-stage machining of the wheel is completed. Finally, the lathe bed is started for second-stage turning, and the second tool turret is controlled by the second servo feed system to feed, so as to realize linkage turning of the X2 axis and the Z2 axis. After the second-stage turning, discharging is carried out by the manipulator or operators.

The equipment can integrate the first-stage turning and the second-stage turning into one piece of equipment, so as to improve the matching precision of the central hole and the mandrel in the second stage, realize the high-precision connection of the first-stage turning and the second-stage turning, improve the coaxiality of the inner side and the outer side of the wheel, and improve the product quality.

LIST OF REFERENCE SYMBOLS

Figure 1:
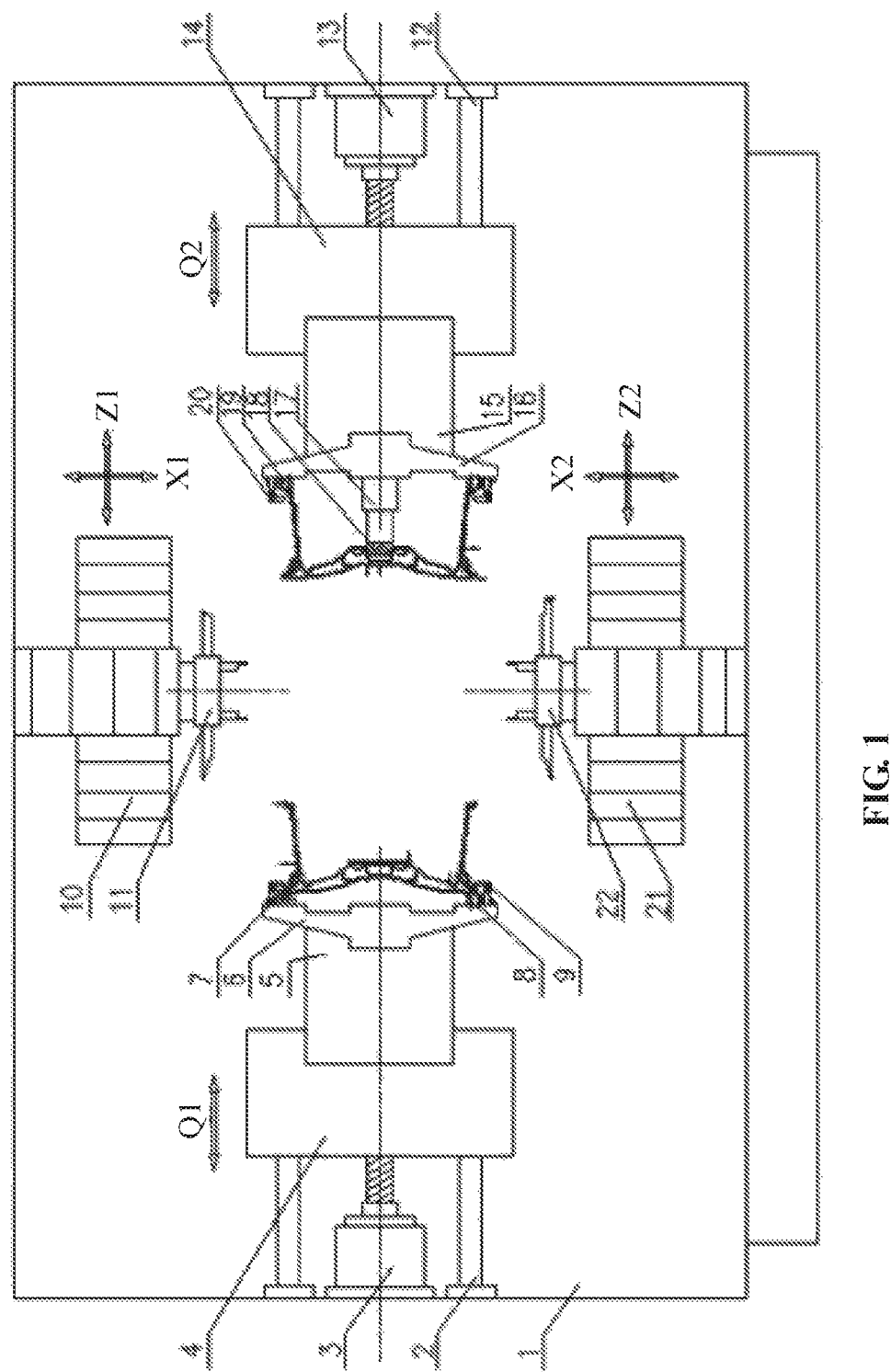
FIG. 1 is a front view of wheel machining equipment according to the present disclosure.
Figure 2:
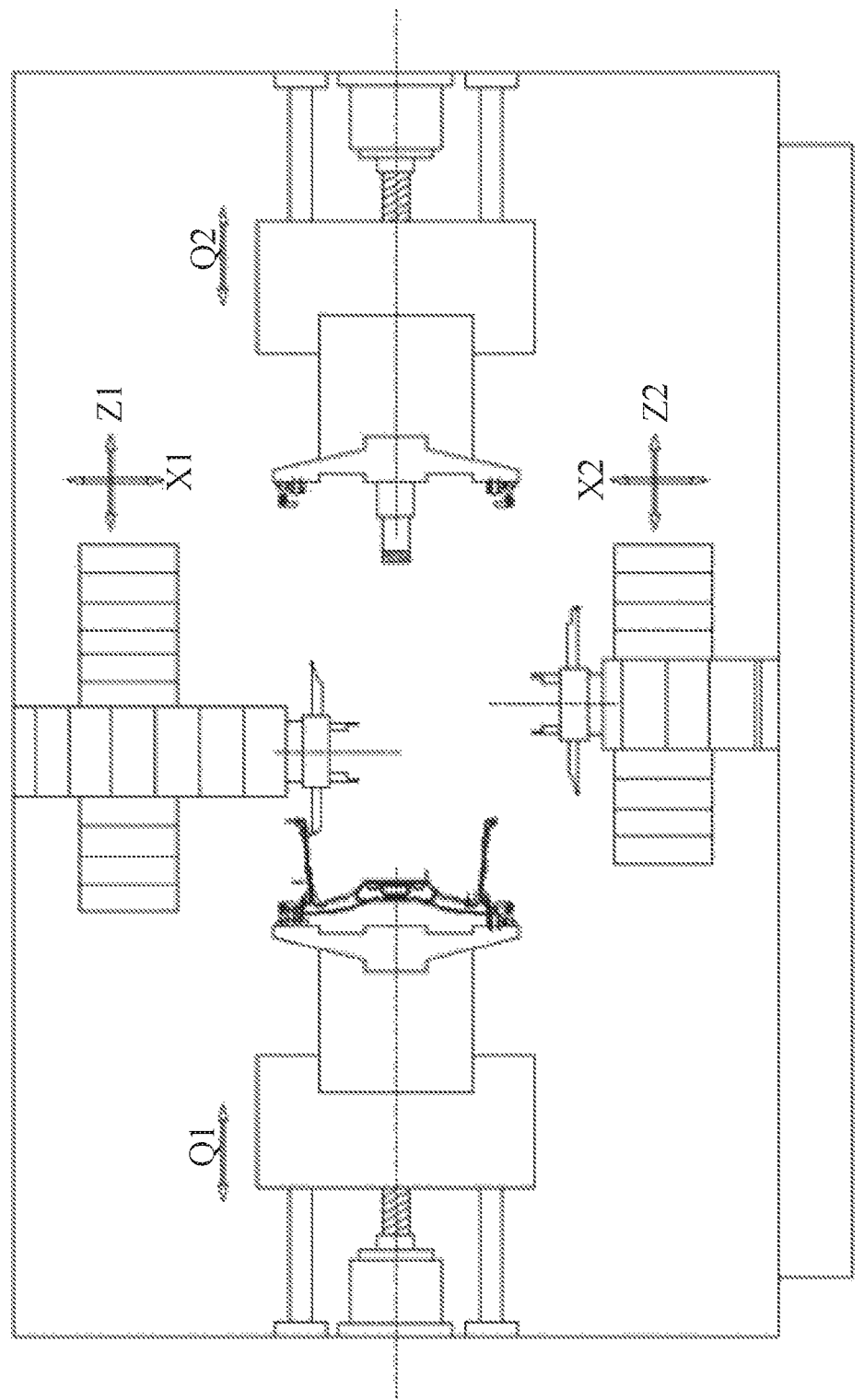
FIG. 2 is a schematic diagram of first-stage machining of wheel machining equipment according to the present disclosure.
Figure 3:
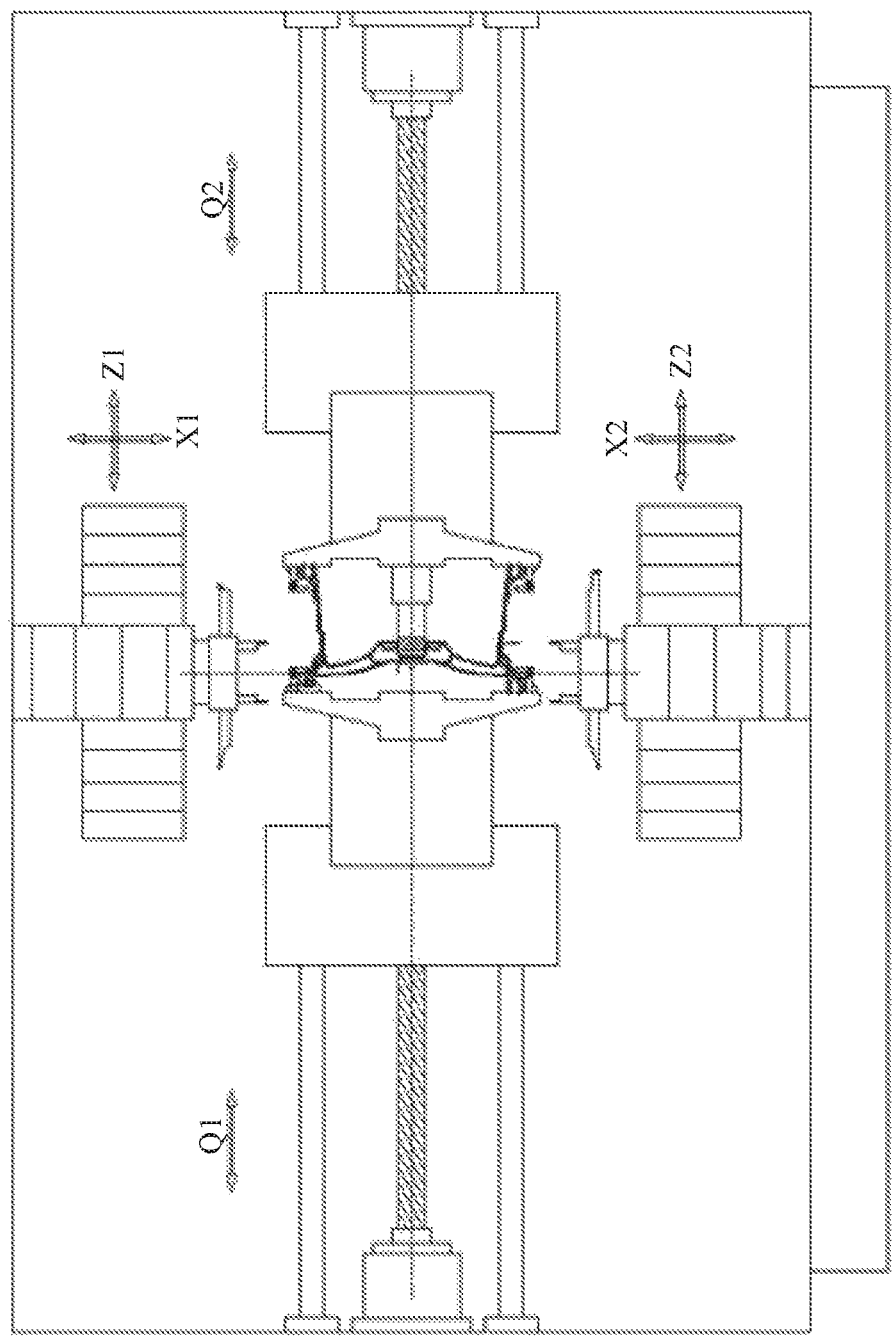
FIG. 3 is a schematic diagram of high-precision connection of first-stage machining and the second-stage machining of wheel machining equipment according to the present disclosure.
Figure 4:
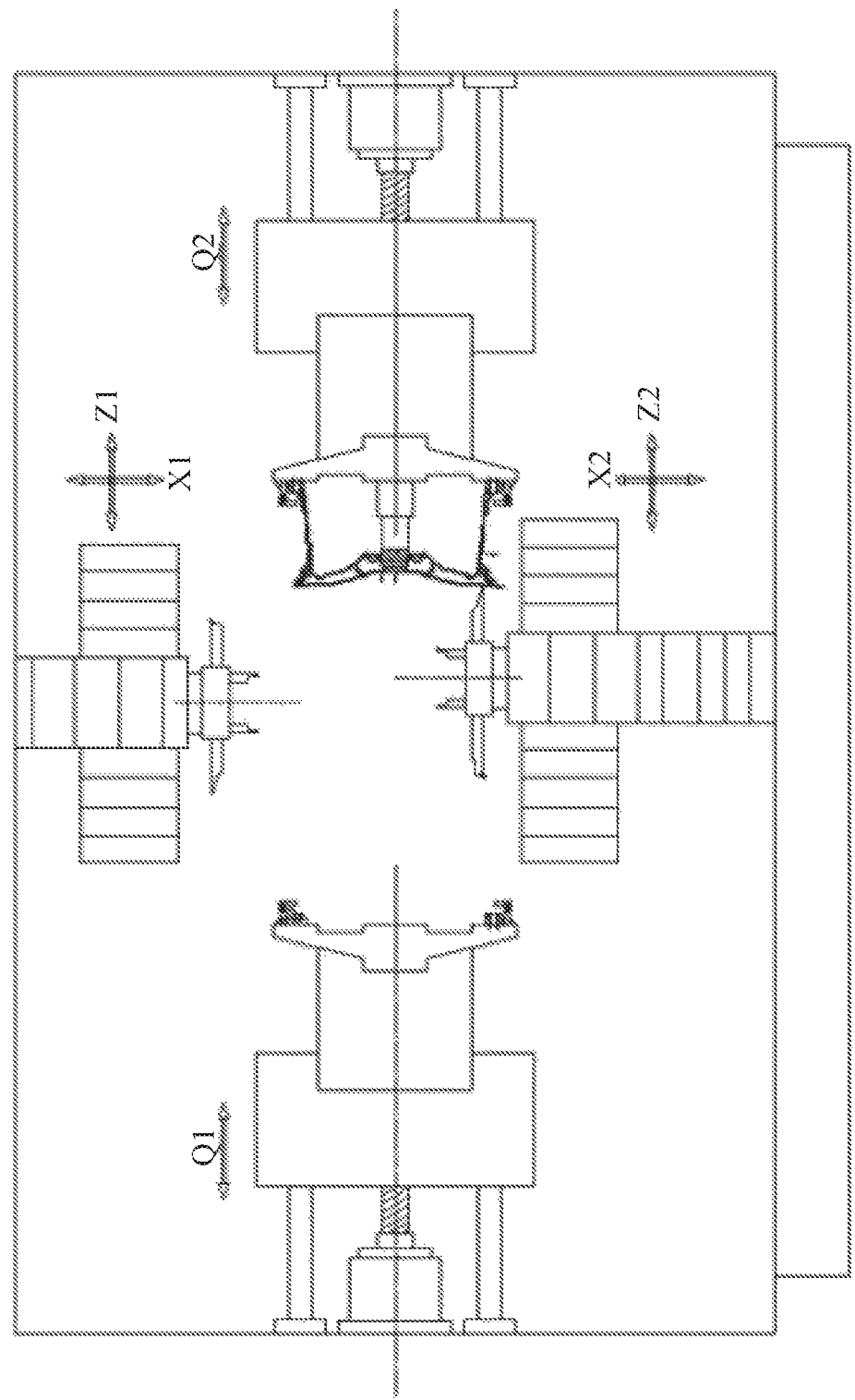
FIG. 4 is a schematic diagram of second-stage machining of wheel machining equipment according to the present disclosure.

1—lathe bed, 2—first guide rail, 3— first servo motor, 4— first servo moving unit, 5— first spindle unit, 6— first-stage chuck, 7— radial positioning block, 8— first end-face positioning block, 9— first swing clamp cylinder pressure claw, 10— first servo feed system, 11— first tool turret, 12— second guide rail, 13— second servo motor, 14— second servo moving unit, 15— second spindle unit, 16— second-stage chuck, 17— mandrel base, 18— mandrel, 19— second end-face positioning block, 20— second swing clamp cylinder pressure claw, 21— second servo feed system, 22— second tool turret.

DETAILED DESCRIPTION OF THE EMBODIMENTS

The specific details and working conditions of the equipment provided by the present disclosure will be described below in conjunction with the accompanying drawings.

Wheel machining equipment includes a lathe bed 1, a plurality of first guide rails 2, a first servo motor 3, a first servo moving unit 4, a first spindle unit 5, a first-stage chuck 6, a plurality of radial positioning blocks 7, a plurality of first end-face positioning blocks 8, a plurality of first swing clamp cylinder pressure claws 9, a first servo feed system 10, a first tool turret 11, a plurality of second guide rails 12, a second servo motor 13, a second servo moving unit 14, a second spindle unit 15, a second-stage chuck 16, a mandrel base 17, a mandrel 18, a plurality of second end-face positioning blocks 19, a plurality of second swing clamp cylinder pressure claws 20, a second servo feed system 21 and a second tool turret 22.

The first servo motor 3, the first guide rails 2 and the first servo moving unit 4 are installed on the left side of the lathe bed 1. The first servo moving unit 4 may be driven by the first servo motor 3 to horizontally move along the first guide rails 2, and the path of the first servo moving unit 4 is defined as a Q1 axis. The first servo moving unit 4 is provided with the first spindle unit 5, an output end of the first spindle unit 5 is provided with the first-stage chuck 6, and the rotation of the first-stage chuck 6 is controlled by the first spindle unit 5. The three radially adjustable radial positioning blocks 7 are 120 degrees apart and are uniformly distributed on the first-stage chuck 6 in the circumferential direction, and the radial positioning blocks 7 are used for radially positioning a wheel during first-stage machining; the three first end-face positioning blocks 8 are 120 degrees apart and are uniformly distributed on the first-stage chuck 6 in the circumferential direction, and the first end-face positioning blocks 8 are used for axially positioning the wheel during first-stage machining; and the three first swing clamp cylinder pressure claws 9 are 120 degrees apart and are uniformly distributed on the first-stage chuck 6 in the circumferential direction, and the first swing clamp cylinder pressure claws 9 are used for clamping the wheel during first-stage machining. The first servo feed system 10 is installed at the top of the lathe bed 1, the first servo feed system 10 includes two axes which are defined as an X1 axis and a Z1 axis, and the first tool turret 11 is controlled by the first servo feed system 10 to feed, so as to realize linkage turning and interpolation movement of the X1 axis and the Z1 axis. This makes the first-stage turning system. The first spindle unit 5 drives the wheel to rotate, and the first servo feed system 10 controls the first tool turret 11 to feed to realize the two-axis linkage cutting for completing the first-stage machining of the wheel.

The second servo motor 13, the second guide rails 12 and the second servo moving unit 14 are installed on the right side of the lathe bed 1. The second servo moving unit 14 can be driven by the second servo motor 13 to horizontally move along the second guide rails 12, and the path of the second servo moving unit 14 is defined as a Q2 axis. The second servo moving unit 14 is provided with the second spindle unit 15, an output end of the second spindle unit 15 is provided with the second-stage chuck 16, and the rotation of the second-stage chuck 16 is controlled by the second spindle unit 15. The mandrel base 17 is arranged at the center of the second-stage chuck 16, the mandrel 18 is arranged on the mandrel base 17, and the mandrel 18 is used for radially positioning the wheel during second-stage machining; the three second end-face positioning blocks 19 are 120 degrees apart and are uniformly distributed on the second-stage chuck 16 in the circumferential direction, and the second end-face positioning blocks 19 are used for axially positioning the wheel during second-stage machining; and the three second swing clamp cylinder pressure claws 20 are 120 degrees apart and are uniformly distributed on the second-stage chuck 16 in the circumferential direction, and the second swing clamp cylinder pressure claws 20 are used for clamping the wheel during second-stage machining. After the first-stage turning of the wheel is completed, the wheel does not need to be unloaded, and the first servo moving unit 4 is driven by the first servo motor 3 to do horizontal rightward movement along the Q1 axis until horizontally pushing the wheel to an appropriate position; at the same time, the second servo moving unit 14 is driven by the second servo motor 13 to do horizontal leftward movement along the Q2 axis to meet the wheel; and when the second end-face positioning blocks 19 on the second-stage chuck 16 make contact with a wheel rim on the inner side of the wheel, the second servo moving unit 14 stops moving, then the second swing clamp cylinder pressure claws 20 are activated and clamp the wheel on the second-stage chuck 16, and then the first swing clamp cylinder pressure claws 9 release the wheel, and the first-stage chuck 6 is withdrawn and restored to its original position. At this point, high-precision connection of the first-stage machining and the second-stage machining is completed.

As the wheel is not unloaded during connection, high-precision matching of a central hole processed in the first stage and the mandrel in the second stage can be ensured, the matching precision can reach 0.02-0.03 mm, which is greatly improved compared with the traditional 0.04-0.06 mm, and the coaxiality in the first stage and the second stage is greatly improved.

The second servo feed system 21 is installed on the bottom of the lathe bed 1, the second servo feed system 21 includes two axes which are defined as an X2 axis and a Z2 axis, and the second tool turret 22 is controlled by the second servo feed system 21 to feed, so as to realize linkage turning and interpolation movement of the X2 axis and the Z2 axis. This makes the second-stage turning system. The second spindle unit 15 drives the wheel to rotate, and the second servo feed system 21 controls the second tool turret 22 to feed to realize the two-axis linkage cutting for completing the second-stage machining of the wheel.

The working process of the wheel machining equipment includes: firstly, feeding is carried out by a manipulator or operators, a wheel blank is clamped on the first-stage chuck 6, then the lathe bed is started, and the first tool turret 11 is controlled by the first servo feed system 10 to feed, so as to realize first-stage linkage turning of the X1 axis and the Z1 axis; after the first-stage turning of the wheel is completed, the wheel does not need to be unloaded, and the first servo moving unit 4 is driven by the first servo motor 3 to do horizontal rightward movement along the Q1 axis until horizontally pushing the wheel to the appropriate position; at the same time, the second servo moving unit 14 is driven by the second servo motor 13 to do horizontal leftward movement along the Q2 axis to meet the wheel; and when the second end-face positioning blocks 19 on the second-stage chuck 16 make contact with the wheel rim on the inner side of the wheel, the second servo moving unit 14 stops moving, then the second swing clamp cylinder pressure claws 20 are activated and clamp the wheel on the second-stage chuck 16, then the first swing clamp cylinder pressure claws 9 release the wheel, and the first-stage chuck 6 is withdrawn and restored to its original position. At this point, high-precision connection of the first-stage machining and the second-stage machining of the wheel is completed. Finally, the lathe bed is started for second-stage turning, and the second tool turret 22 is controlled by the second servo feed system 21 to feed, so as to realize linkage turning of the X2 axis and the Z2 axis. After the second-stage turning, discharging is carried out by the manipulator or operators.

The equipment can integrate the first-stage turning and the second-stage turning into one piece of equipment, so as to improve the matching precision of the central hole and the mandrel in the second stage, realize the high-precision connection of the first-stage turning and the second-stage turning, improve the coaxiality of the inner side and the outer side of the wheel, and improve the product quality.

The invention claimed is:

1. Wheel machining equipment, comprising: a lathe bed, a plurality of first guide rails, a first servo motor, a first servo moving unit, a first spindle unit, a first-stage chuck, a plurality of radial positioning blocks, a plurality of first end-face positioning blocks, a plurality of first swing clamp cylinder pressure claws, a first servo feed system, a first tool turret, a plurality of second guide rails, a second servo motor, a second servo moving unit, a second spindle unit, a second-stage chuck, a mandrel base, a mandrel, a plurality of second end-face positioning blocks, a plurality of second swing clamp cylinder pressure claws, a second servo feed system and a second tool turret, wherein the first servo motor, the plurality of first guide rails and the first servo moving unit are installed on a left side of the lathe bed, and the first servo moving unit is driven by the first servo motor to horizontally move along the plurality of first guide rails;

the first servo moving unit is provided with the first spindle unit, an output end of the first spindle unit is provided with the first-stage chuck, and rotation of the first-stage chuck is controlled by the first spindle unit; the plurality of radial positioning blocks are uniformly distributed on the first-stage chuck in a circumferential direction and are used for radially positioning a wheel during first-stage machining; the plurality of first end-face positioning blocks are uniformly distributed on the first-stage chuck in the circumferential direction and are used for axially positioning the wheel during the first-stage machining; the first servo feed system is installed at top of the lathe bed, the first servo feed system comprises two axes, and the first tool turret is controlled by the first servo feed system to feed, so as to move along the two axes of the first servo feed system, to realize linkage turning and interpolation movement of the two axes of the first servo feed system; the first spindle unit is arranged to drive the wheel to rotate to complete the first-stage machining of the wheel;

the second servo motor, the plurality of second guide rails and the second servo moving unit are installed on a right side of the lathe bed, and the second servo moving unit is driven by the second servo motor to horizontally move along the plurality of second guide rails; the second servo moving unit is provided with the second spindle unit, an output end of the second spindle unit is provided with the second-stage chuck, and rotation of the second-stage chuck is controlled by the second spindle unit; the mandrel base is arranged at a center of the second-stage chuck, and the mandrel is arranged on the mandrel base and extends through a central hole of the wheel for radially positioning the wheel during second-stage machining; the plurality of second end-face positioning blocks are uniformly distributed on the second-stage chuck in the circumferential direction and are used for axially positioning the wheel during the second-stage machining; the second servo feed system is installed on a bottom of the lathe bed, the second servo feed system comprises two axes, and the second tool turret is controlled by the second servo feed system to feed, so as to move along the two axes of the second servo feed system, to realize linkage turning and interpolation movement of the two axes of the second servo feed system; the second spindle unit is arranged to drive the wheel to rotate to complete the second-stage machining of the wheel;

a path of the first servo moving unit horizontally moving along the plurality of first guide rails is defined as a Q1 axis, and a path of the second servo moving unit horizontally moving along the plurality of second guide rails is defined as a Q2 axis;

after the first-stage machining of the wheel is completed, the first servo moving unit is arranged to be driven by the first servo motor to do horizontal rightward movement from an original position along the Q1 axis until horizontally pushing the wheel to an appropriate position, the second servo moving unit is arranged to be driven by the second servo motor to do horizontal leftward movement along the Q2 axis to meet the wheel, when the plurality of second end-face positioning blocks on the second-stage chuck make contact with a wheel rim on an inner side of the wheel, the second servo moving unit stops moving, then the plurality of second swing clamp cylinder pressure claws are activated and clamp the wheel on the second-stage chuck, then the plurality of first swing clamp cylinder pressure claws release the wheel, and the first-stage chuck is withdrawn and restored to the original position, thus completing connection of the first-stage machining and the second-stage machining.

2. A wheel machining method, performed by the wheel machining equipment according to claim 1, the wheel machining method comprising the first-stage machining, the connection and the second-stage machining, and comprising the steps:

carrying out feeding by a manipulator or operators for clamping a wheel blank on the first-stage chuck, then starting the lathe bed, and controlling, by the first servo feed system, the first tool turret to feed;

after completing of the first-stage machining of the wheel, not unloading the wheel, and driving, by the first servo motor, the first servo moving unit to do horizontal rightward movement along the Q1 axis to horizontally push the wheel to the appropriate position; driving, by the second servo motor, the second servo moving unit to do horizontal leftward movement along the Q2 axis to meet the wheel; stopping, by the second servo moving unit, moving when the plurality of second end-face positioning blocks on the second-stage chuck make contact with the wheel rim on the inner side of the wheel and the mandrel on the second-stage chuck extends through the central hole of the wheel, then activating the plurality of second swing clamp cylinder pressure claws, clamping, by the plurality of second swing clamp cylinder pressure claws, the wheel on the second-stage chuck, then enabling the plurality of first swing clamp cylinder pressure claws to release the wheel, withdrawing the first-stage chuck and restoring the first-stage chuck to the original position, thus completing the connection of the first-stage machining and the second-stage machining, so as to carry out the second-stage machining; and performing, by the manipulator or operators, discharging after the second-stage machining in which the second tool turret is controlled by the second servo feed system to feed is completed.

* * * * *